E. JUANES Y PATRULLO.
Machine for Separating Fibers from Plants.
No. 38,330. Patented April 28, 1863.
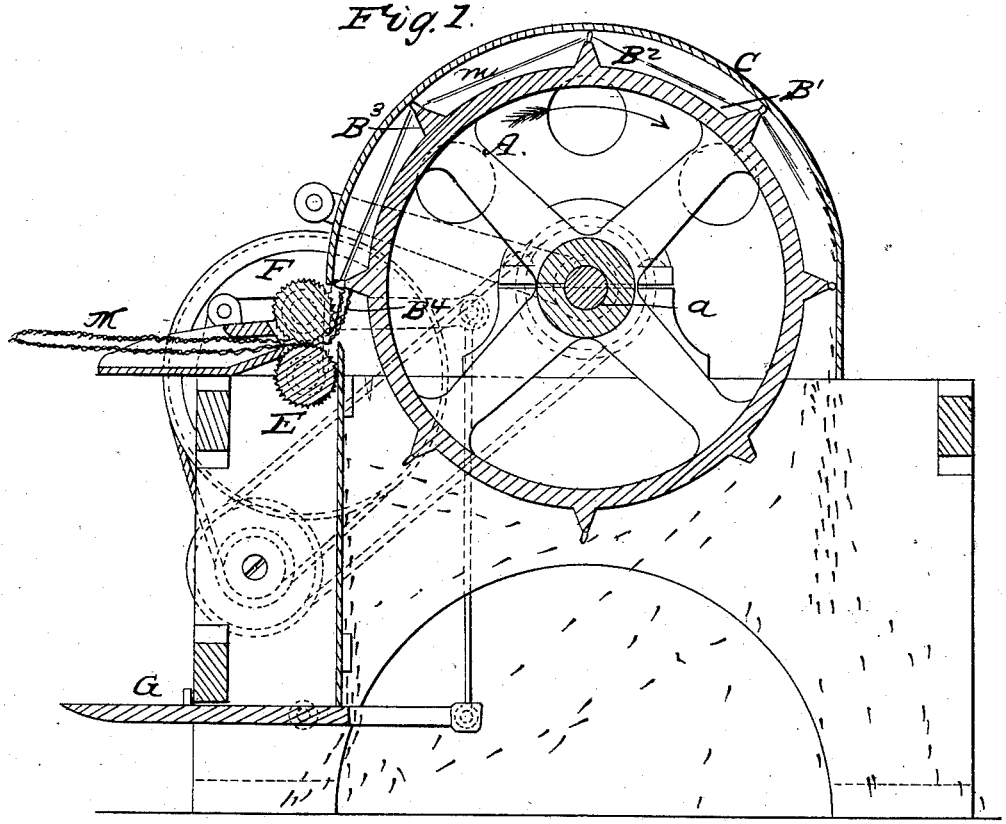
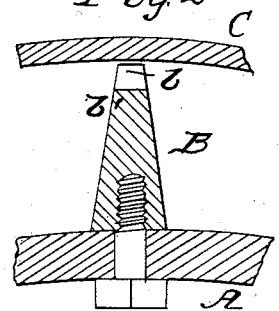
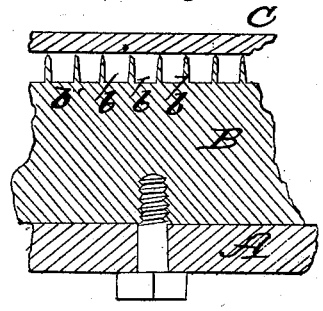

UNITED STATES PATENT OFFICE.

EDUARDO JUANES Y PATRULLO, OF NEW YORK, N. Y.

IMPROVEMENT IN MACHINERY FOR SEPARATING THE FIBERS OF TROPICAL PLANTS.

Specification forming part of Letters Patent No. 38,330, dated April 28, 1863.

*To all whom it may concern:*

Be it known that I, EDUARDO JUANES Y PATRULLO, a native of the Kingdom of Spain, but now residing in New York city, in the State of New York, have invented a certain new and useful Improvement in Machines for Separating the Fibers of Tropical Plants, which is more especially adapted for treating the leaves of the plant known as the *Agave Americana*, for the production of what is known as "sisal," or "sisal hemp;" and I do hereby declare that the following is a full, clear, and exact description thereof, reference being had to the accompanying drawings, and to the letters of reference marked thereon.

Figure 1 is a longitudinal section through the machine, the material to be treated being represented in red. Fig. 2 is a section, and Fig. 3 a side view, of a portion of one of the combs on a larger scale, so as to show its form more exactly.

My machine is remarkably simple and successful, and differs from previous machines for such purpose more in its mode of operation than its general structure or appearance. The leaves may be introduced and withdrawn by hand, treating first one end and then the other, the flesh being removed from the fiber by the combs and immediately thrown off from the latter by gravity and centrifugal force. The leaves may be in their natural state or may be crushed, boiled, or otherwise prepared beforehand. I prefer to boil the leaves and roll them through plain or cylindrical rolls before introducing them into the machine.

To enable others skilled in the art to make and use my invention, I will proceed to describe its construction and operation by the aid of the drawings, and of the letters of reference marked thereon.

A is a drum mounted on the shaft $a$, and provided with a pulley or other means for the application of power by which it is rotated rapidly. I make this drum about thirty-six inches in diameter.

$B'$ $B^2$, &c., are combs, formed as represented and fixed on the periphery of A. These are eight in number.

C is a closely-fitting casing mounted on the framing of the machine. The motion of A is in the direction indicated by the arrow. I have found the machine to operate successfully with this drum A and its attachments performing about three hundred and sixty revolutions per minute.

E and F are deeply-fluted feeding-rollers. The feeding is effected by a slow rotation of the lower roll, E, and consequently of the upper roll, F, so long as they are in contact, the upper roll, F, resting upon the lower, so that the two shall control the motion of the material introduced between them. When it is desired to reverse the material, the upper roll, F, is lifted out of contact with the lower roll, E, by the aid of the treadle G and its connections.

M is a portion of a leaf of the *Agave* which has not been treated by the machine.

$m$ is the long and tough fiber which has been exposed by the removal of the fleshy part of the leaf.

A leaf is inserted endwise between the rolls E F, and is seized thereby and urged slowly forward. The combs B strike it and bend it upward, drawing it between the said combs and the interior of the cap or top case, C, with which the combs run in close contact. As the operation proceeds, the material extends further around and allows two or more of the combs B to be acting at once upon the same leaf. The draft or pull induced by the action of the foremost comb, B', conspires with the gravity of the material to draw the latter down upon and into the succeeding comb, and the draft of both these draws the material still more forcibly into the next succeeding comb. The teeth $b\ b\ b$, &c., of the combs are short and strong, and the bottom of each space between one tooth and another is filed or otherwise finished, so as to present a sharp angle, $b$, as represented. The width of the combs below the roots of the teeth, or, in other words, the distance of these angles from the periphery of the drum A, is so great that although the distance of the combs each from its predecessor is one-eighth of the entire circumference, the fiber does not touch the surface of the drum between the combs, but may be drawn across in straight lines from the roots of the teeth of one comb to the roots of the teeth of the succeeding comb, making an angle of forty-five degrees from a straight line at each comb, and the fiber is thus scraped with great force by the sharp surface there presented.

It will be observed that the material, so long as it remains held by the feed-rolls E F, does not partake of the centrifugal force due to the rapid rotation of A B, and that the close proximity or actual contact of the case C with the points of the combs B prevents the material from rising out of contact with the combs under any conditions or for any period however brief. The result is, first, a thorough cleaning of the fibers from their extreme ends to a point near the feed-rolls E F by reason of the combing they receive from the widely-separated combs thus conditioned and operated; second, a constantly clean condition of the interior of the case C by reason of the action of the combs thereon; third, a constantly clean condition of the combs by reason of the throwing off of the fleshy material by the aid of the centrifugal force due to the high velocity. The high velocity adopted in operating this machine in this manner is allowable because of the small number and simple relations of the parts. Such a velocity is not allowable on any previous machine known to me in which combs are worked in connection with feeding mechanism suitable for this purpose.

In my patent dated the 5th of March, 1861, I have shown revolving combs working the material between themselves and an apron; but such apron was below the drum instead of in the position of my cap C, and was neither of sufficient length nor in the right position to produce the effect of my present invention. In my patent dated the 23d of April, 1861, I have shown a cap or top case, but the machine was supplied with and depended in its action upon a pair of endless belts and a series of cross-bars for clearing the combs, and these rendered it imperatively necessary that the machine should be driven slowly, as otherwise the cross-bars would be so disturbed by centrifugal force that the machine would be soon deranged and destroyed. My present machine, by dispensing with those belts and clearing-bars and adopting a high rate of speed, with combs and case formed and operating together in the simple manner above described, involves a new mode of operation, which is so far superior to any before known to me as to make my machine many fold more efficient.

Having now fully described my invention, what I claim as new, and desire to secure by Letters Patent, is as follows:

The improved machine herein described for the preparation of the fiber of *Agave Americana* and the like tropical plants, the same consisting of a drum with widely-separated combs, formed with teeth $b\ b$ and scraping-surfaces $b'$, substantially as represented, operating at a high velocity within and under a closely-fitted stationary case, and combined with feed-rolls adapted to allow the presentation and removal of the leaves, substantially in the manner and with the advantages herein set forth.

EDUARDO JUANES Y PATRULLO.

Witnesses:
   P. TROOPS,
   THOMAS D. STETSON.